US009825729B2

(12) United States Patent
Huang et al.

(10) Patent No.: US 9,825,729 B2
(45) Date of Patent: Nov. 21, 2017

(54) SPATIAL REUSE OF WI-FI CHANNELS WITH INTERFERENCE ESTIMATION AND CONTROL

(71) Applicant: Intel IP Corporation, Santa Clara, CA (US)

(72) Inventors: Po-Kai Huang, West Lafayette, IN (US); Rongzhen Yang, Shanghai (CN); Robert J. Stacey, Portland, OR (US); Hujun Yin, Saratoga, CA (US)

(73) Assignee: Intel IP Corporation, Santa Clara, CA (US)

( * ) Notice: Subject to any disclaimer, the term of this patent is extended or adjusted under 35 U.S.C. 154(b) by 402 days.

(21) Appl. No.: 14/315,723

(22) Filed: Jun. 26, 2014

(65) Prior Publication Data

US 2015/0382360 A1 Dec. 31, 2015

(51) Int. Cl.
*H04L 1/00* (2006.01)
*H04W 72/08* (2009.01)
*H04W 92/18* (2009.01)
*H04W 84/12* (2009.01)

(52) U.S. Cl.
CPC ............ *H04L 1/00* (2013.01); *H04W 72/082* (2013.01); *H04W 84/12* (2013.01); *H04W 92/18* (2013.01)

(58) Field of Classification Search
CPC ...... H04L 1/00; H04W 72/082; H04W 84/12; H04W 92/18; H04W 28/0236; H04W 40/16
USPC .......................... 370/252, 328, 329, 338, 401
See application file for complete search history.

(56) References Cited

U.S. PATENT DOCUMENTS

| 2005/0058151 | A1* | 3/2005 | Yeh ........................ H04W 52/46 370/445 |
| 2007/0002803 | A1 | 1/2007 | Destino et al. |
| 2008/0175198 | A1 | 7/2008 | Singh et al. |
| 2009/0052319 | A1* | 2/2009 | Muqattash .......... H04L 12/5695 370/230.1 |

(Continued)

FOREIGN PATENT DOCUMENTS

| TW | 201605258 A | 2/2016 |
| TW | I551159 B | 9/2016 |
| WO | WO-2015199960 A1 | 12/2015 |

OTHER PUBLICATIONS

"International Application Serial No. PCT/US2015/034675, International Search Report dated Aug. 31, 2015", 3 pgs.

(Continued)

*Primary Examiner* — Christine Ng
(74) *Attorney, Agent, or Firm* — Schwegman Lundberg & Woessner, P.A.

(57) ABSTRACT

A transmitter/receiver pair may estimate a first channel interference caused during the spatial reuse phase by the transmitter/receiver pair to other transmitter/receiver pairs over a channel. A second channel interference experienced by the transmitter/receiver pair may be estimated during the spatial reuse phase by the transmitter/receiver pair from the other transmitter/receiver pairs. An interference margin may be estimated for the channel based on the first and second channel interferences. The interference margin may be announced to the other transmitter/receiver pairs in frame. The interference margin may then be complied with while communicating over the channel in order to control the interference.

24 Claims, 4 Drawing Sheets

(56) References Cited

U.S. PATENT DOCUMENTS

| | | | |
|---|---|---|---|
| 2009/0073954 A1* | 3/2009 | Maltsev | H04W 72/082 370/347 |
| 2009/0304096 A1* | 12/2009 | Khattab | H04B 7/0413 375/260 |
| 2013/0058218 A1* | 3/2013 | Wu | H04W 74/0816 370/241 |
| 2013/0208604 A1* | 8/2013 | Lee | H04L 25/0226 370/252 |
| 2013/0315157 A1 | 11/2013 | Krishnamurthy et al. | |
| 2014/0016478 A1 | 1/2014 | Koskela et al. | |
| 2014/0286203 A1* | 9/2014 | Jindal | H04J 11/0026 370/278 |
| 2014/0328270 A1* | 11/2014 | Zhu | H04W 74/002 370/329 |

OTHER PUBLICATIONS

"International Application Serial No. PCT/US2015/034675, Written Opinion dated Aug. 31, 2015", 4 pgs.

Hajek, Bruce, et al., "On the capture probability for a large number of stations", IEEE Transactions on Communications, 45(2), (Feb. 1997), 254-260.

\* cited by examiner

SPATIAL REUSE OF WI-FI CHANNELS WITH INTERFERENCE ESTIMATION AND CONTROL

TECHNICAL FIELD

Embodiments pertain to wireless networks. Some embodiments relate to Wi-Fi channel spatial reuse. Some embodiments relate to High-Efficiency Wireless LAN or High Efficiency Wi-Fi (HEW) and the IEEE 802.11ax standard

BACKGROUND

Institute of Electrical and Electronics Engineers (IEEE) 802.11 is a set of standards for implementing wireless local area network (WLAN) communications. These standards provide the basis for wireless network equipment approved and licensed as Wi-Fi equipment.

Wi-Fi networks typically use access points (AP) to wirelessly communicate with either mobile Wi-Fi-enabled devices (e.g., smart phones, computers, tablet computers). The APs may be connected to a wired network giving the AP access to the Internet. The Wi-Fi-enabled device may then access the Internet through communication over a wireless channel with the AP.

Due to an increasing number of mobile users attempting to access the Internet, the quantity of Wi-Fi-enabled devices is increasing. APs and wireless channels may get overwhelmed by too many Wi-Fi enabled devices.

Thus there are general needs for increased efficiency in Wi-Fi channel usage.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
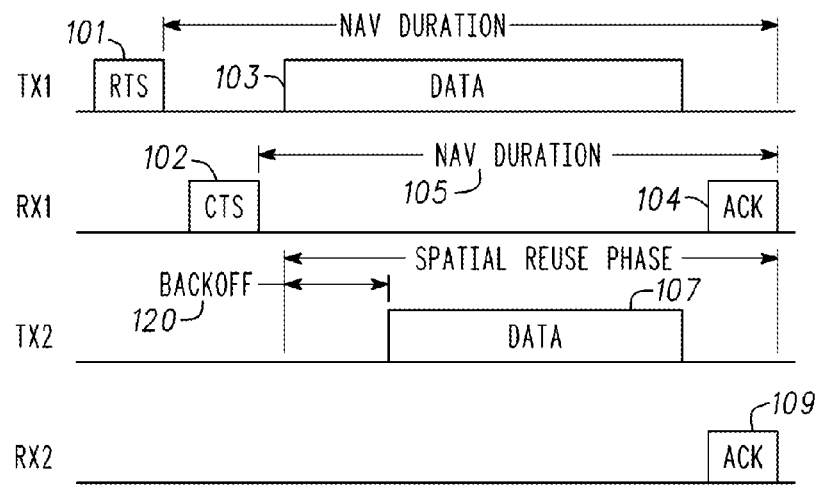
FIG. 1 illustrates a diagram of an embodiment of a frame exchange during a spatial reuse scheme.

FIG. 1 illustrates a diagram of a frame exchange during a spatial reuse scheme. This figure shows two transmit/receive pairs: TX1/RX1 and TX2/RX2. Spatial reuse is one technique to increase the efficiency of the Wi-Fi network. The idea is to increase the threshold of clear channel assessment (CCA) such that a small interference may be tolerated and a spatial resource for transmission may be reused in an area.

For example, FIG. 1 shows that the first transmit/receive pair (e.g., TX1/RX1) exchange some type of frames 101, 102 (e.g., request to send (RTS)/clear to send (CTS)) in order to open a spatial reuse phase. An interference margin for TX1 and RX1 is announced to make sure that the interference from additional transmission complies with the interference margin. TX1 may transmit data 103 to RX1 during the network allocation vector (NAV) time 105. As is known in the art, the NAV may represent the time that the sending station intends to hold the medium busy.

If a second transmitter (TX2) meets the interference conditions set by the interference margin from TX1 and RX1, then TX2 may transmit data 107, after an additional back-off time 120 (i.e., random choice of transmit time slot by transmitting device), during the NAV time 105 set by TX1. RX1 may acknowledge receipt of TX1 data by transmitting an ACK frame 104 to TX1. Similarly, RX2 may acknowledge receipt of the TX2 data by transmitting an ACK frame 109 to TX2.

Spatial reuse may work for legacy Wi-Fi devices since the legacy devices do not transmit during the spatial reuse phase and their performance may not be affected when other Wi-Fi devices raise the CCA threshold. However, spatial reuse may result in a number of problems, as illustrated in FIG. 2.

Figure 2:
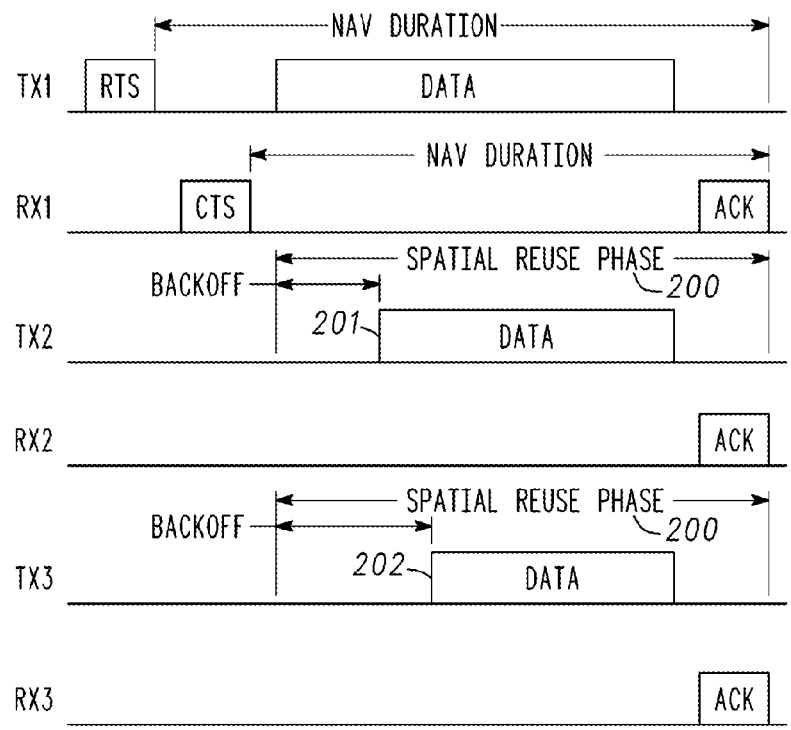
FIG. 2 illustrates a diagram of another embodiment of a frame exchange during a spatial reuse scheme.

FIG. 2 illustrates a diagram of another embodiment of frame exchange during a spatial reuse scheme. This figure shows three transmit/receive pairs: TX1/RX1, TX2/RX2, TX3/RX3. FIG. 2 shows that two transmitter TX2, TX3 are both transmitting data 201, 202, during the spatial reuse phase 200. The TX1/RX1 pair may have set their modulation and coding schemes to compensate for a particular interference margin. However, with two transmitter/receiver pairs transmitting within the spatial reuse phase 200, the total interference experienced by RX1 may increase. The IEEE 802.11 framework does not specify how to control the total interference to RX1 when there is more than one transmission in the spatial reuse phase 200.

Other problems with a typical spatial reuse scheme may include that the IEEE 802.11 framework may not guarantee that the transmission from TX2 to RX2 will be successful. Nor does the framework guarantee that the aggregate performance may increase.

As described subsequently in greater detail, the present embodiments enable each transmit/receive pair exchange frames so that each pair may determine the interference caused by their transmissions on other pairs. Additionally, the interference caused by other pairs may be determined from this frame exchange as well. The present embodiments may also set, announce, and comply with the interference margin of each transmission such that the total interference for each transmission may be controlled if the margin is compiled with by neighboring transmit/receive pairs.

Also as described subsequently, the present embodiments may both explicitly and implicitly verify that a transmitter can know if its transmission will be disrupted by an existing transmission. In the explicit approach, the transmitter may request feedback from the receiver before transmissions in order to know the current interference. In the implicit approach, the interference information may be gathered during a management frame exchange such that a transmitter can infer if the current interference will disrupt its transmission. In another embodiment, the interference margin may be set such that the aggregate performance may improve.

Figure 3:
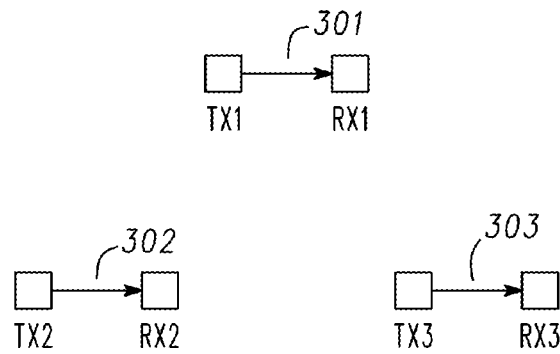
FIG. 3 illustrates a block diagram of a Wi-Fi system of transmit/receive pairs.

FIG. 3 illustrates a block diagram of a Wi-Fi system (e.g., IEEE 802.11ax) of transmit/receive pairs 301-303. Each pair includes transmitter TX1, TX2, TX3 and a receiver RX1, RX2, RX3. The transmitter TX1-TX3 may be an AP or a station. Similarly, the receiver RX1-RX3 may be a station or an AP. In a device-to-device scenario, both transmitters TX1-TX3 and the receivers RX1-RX3 may be stations. More detailed block diagrams of the APs and stations are shown and discussed subsequently.

A Wi-Fi transmission may be from a station-to-station, station-to-AP, AP-to-station, or AP-to-AP. Thus, a transmitter/receiver pair (e.g., Wi-Fi device pair) may be a station paired with a station, a station paired with an AP, an AP paired with a station, or an AP paired with an AP.

In accordance with some IEEE 802.11ax (High-Efficiency Wi-Fi (HEW)) embodiments, an AP may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station may also communicate with legacy stations in accordance with legacy IEEE 802.11 communication techniques. In some embodiments, the master station may also be configurable communicate with HEW stations outside the HEW control period in accordance with legacy IEEE 802.11 communication techniques, although this is not a requirement.

In some embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In some embodiments, bandwidths of 5 MHz and/or 10 MHz may also be used. In these embodiments, each link of an HEW frame may be configured for transmitting a number of spatial streams.

Figure 4:
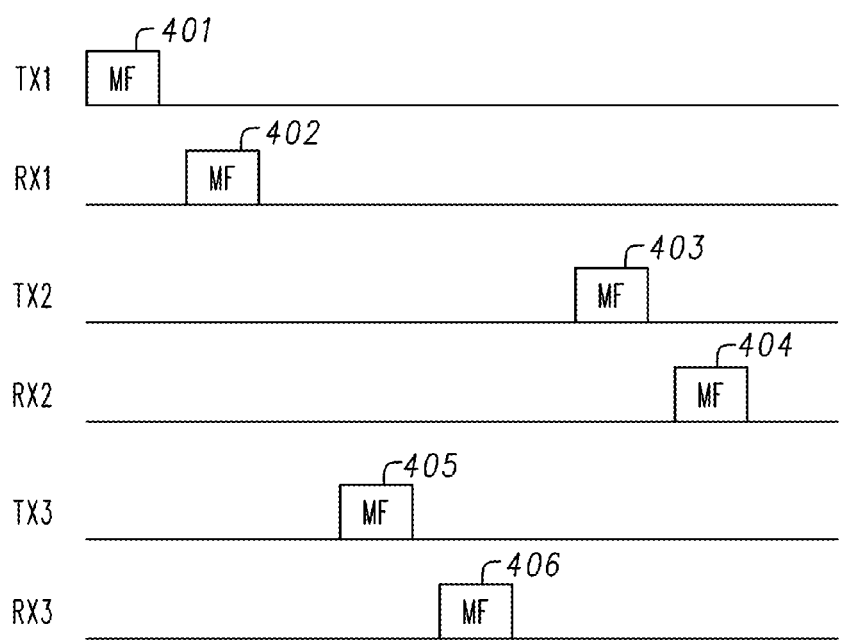
FIG. 4 illustrates a diagram of an embodiment of a frame exchange in accordance with the embodiment of FIG. 3.

FIG. 4 illustrates a diagram of an embodiment of a frame exchange in accordance with the embodiment of FIG. 3. Exchanged frames 401-406 may be management frames that allow for the maintenance of communication. For example, the management frames may include RTS, CTS, polling, authentication, or beacon frames.

The interference created on the channel by each transmitter/receiver pair may be estimated. This may be accomplished by the transmitters TX1-TX3 monitoring transmissions on the channel between the other transmitter/receiver pairs. This provides a first transmitter/receiver pair (e.g., TX1/RX1) with an estimate of the interference caused by the first transmitter/receiver pair to other transmitter/receiver pairs (e.g., TX2-TX3/RX2-RX3) on the channel. The following equation may provide this estimate:

$$\text{Interference} = P_{TX}(RX_E/P_{RX})$$

where $P_{TX}$ is the transmit power of the transmitter that transmitted to the paired receiver, $RX_E$ is the energy received by the transmitter from the paired receiver, and $P_{RX}$ is the transmit power of the receiver paired with the transmitter. For example, when RX1 transmits the management frame 402, TX2 and TX3 may estimate the interference to RX1.

The interference on the channel caused from other transmitter/receiver pairs may also be estimated. In other words, when one TX transmits the management frame 401, 403, 405, other receivers RX may estimate the interference from the transmitting TX by monitoring the received energy. For example, when TX1 transmits the management frame 401, RX2 and RX3 may estimate the interference from TX1.

Once the channel interference has been estimated (i.e., both caused by each transmitter/receiver pair as well as experienced by each transmitter/receiver pair), the interference margin may be set for the channel, as described subsequently. The set interference margin may then be announced on the channel to the transmitter/receiver pairs. Such an announcement may be explicit (e.g., a transmitter announces the set interference margin) or implicit (e.g., the set interference margin is embedded in frames) as described subsequently.

Each transmitter of multiple transmitters may generate an interference that is less than an interference margin M. However, the total interference from all of the transmitters together may still be larger than the interference margin M. This may be illustrated by reference to FIG. 5 with the following description.

Figure 5:
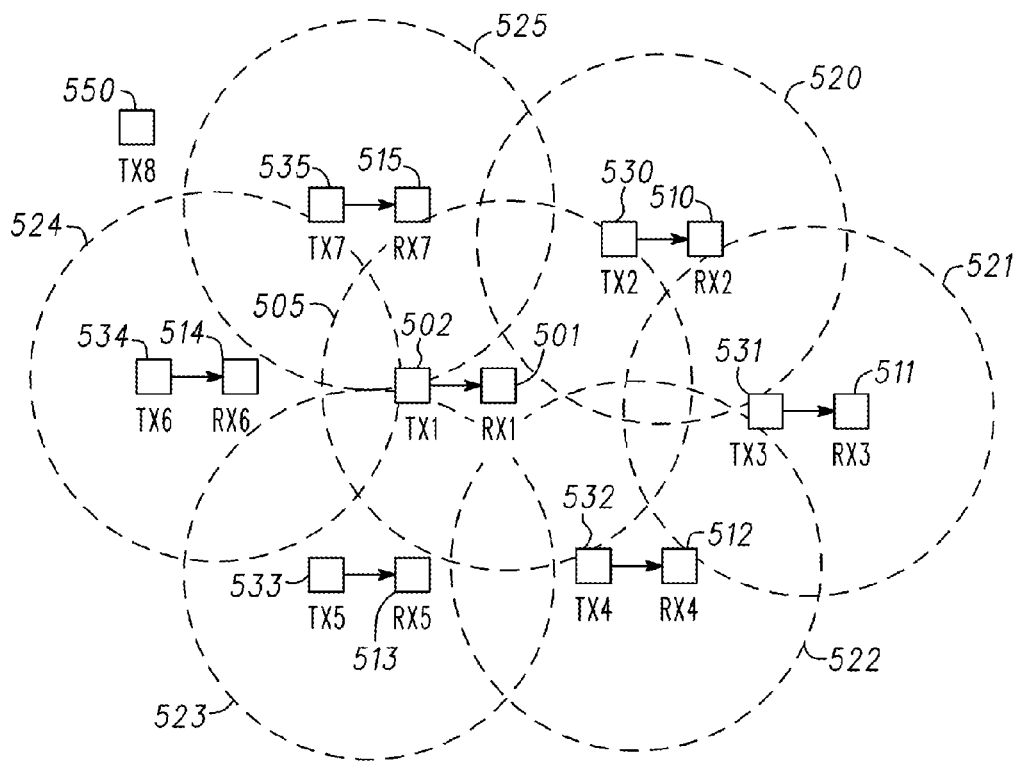
FIG. 5 illustrates a diagram of an embodiment of a Wi-Fi communication system.

Referring to FIG. 5, when a receiver 501 announces an interference margin M, it defines a protected region 505 around the receiver 501 having that interference margin. If a transmitter 502 is within the region 505, the total interference may be larger than M and the transmitter 502 may not transmit in order to avoid exceeding the interference margin M. Hence, the transmitter 502 may only transmit outside the region 505 since its respective interference margin is also around M. However, for each transmitter 530-535 outside the first region 505, an associated receiver 510-515 may also create a respective region 520-525. Therefore, only a finite number of transmitters 530-535 may be used, each having an approximate interference margin M.

The remaining potential transmitter 550 is located a relatively long distance from the first receiver 501. Since it is known that the interference from closer transmitters 530-535 contribute to the major portion of the interference to the first receiver 501, it is possible to use α*M to estimate the total interference. The value of α represents the maximum quantity of transmissions on the channel (from the transmitters 530-535) and will depend on each different scenario.

Based on the above, since M is the maximum interference allowed by a receiver for each transmission and α*M represents an estimate of the total interference for the channel, the maximum allowed interference margin for a receiver to transmitter may be represented as Max_M and the interference margin M is set as M=Max_M/α, where α represents the maximum number of transmissions on the channel.

Once the interference margin M has been set for the channel, it may be announced to the transmitter and receivers on the channel. This may be accomplished by explicitly transmitting the set interference margin or implicitly embedded in a frame to be transmitted.

The explicit transmission of the interference margin M may be accomplished through a dedicated interference margin frame. In one embodiment, the transmitter TX may announce the margin on the channel by transmitting the interference margin frame. Other stations on the channel may be monitoring the channel and receive the frame. This may be performed during the spatial reuse phase as shown in FIGS. 1 and 2. In another embodiment, the transmitter TX may send a request to an associated receiver RX and the receiver RX may reply with the dedicated interference margin frame. Other stations on the channel may again be monitoring the channel and receive the frame.

The implicit transmission of the interference margin M may be accomplished when a receiver RX exchanges frames with its associated transmitter TX. The interference margin may be embedded in one of the frames that have a purpose other than explicitly announcing the interference margin.

Once the interference margin has been set and announced, as described previously, it is up to the other transmitter/receiver pairs (e.g., TX/RX) to comply with the set interference margin. This enables the total interference on the channel to be controlled. The total interference may be controlled using various embodiments including when the transmitter knows which transmitter/receiver pair has transmission rights at the moment and when the transmitter does not know which transmitter/receiver pair has transmission rights.

When the transmitter knows which transmitter/receiver pair has transmission rights, the interference control may be performed based on the previous transmission, from that particular transmitter/receiver pair, of the interference margin. Thus, this embodiment relies on a known transmitter/receiver pair that has already announced its respective interference margin.

However, if the transmitter (e.g., TX1) does not know which transmitters are transmitting, the interference margin may be determined by inferring which transmitter is presently transmitting. In this embodiment, TX1 may proceed with its transmission. During frame exchange, TX1 may record if the interference it causes to the channel is less than the interference margin announced by other transmitter/receiver pairs. Also during frame exchange, TX1 may record the energy level of other transmitters (TXs) that, combined with the transmission of TX1, have a channel interference higher than the interference margin. During spatial reuse, TX1 may only transmit if the current energy level is not higher than the energy level of any transmitter that TX1 records during the spatial reuse phase.

As an example of operation, reference is made to the system embodiment illustrated in FIG. 3. After a management frame exchange, TX1 is assumed to have the energy level information for the TX2/RX2 and TX3/RX3 pairs.

If the energy level of TX1 fits in the interference margin of the TX3/RX3 pair but not the interference margin of the TX2/RX2 pair, then TX1 knows that, if the total channel energy level is above the energy level of the TX2/RX2 pair, there is a chance that TX2 or RX2 are transmitting. On the other hand, if the total channel energy level is below the energy level of the TX2/RX2 pair, then the TX2/RX2 pair is not transmitting and TX1 may transmit and infer that it still fits within the interference margin of existing transmissions.

In this way, TX1 may proceed with its transmission and comply with the interference margin.

It has been previously shown how to transmit during a spatial reuse phase while not disrupting other transmissions. It may now be shown how a transmitter knows that its transmission will be successful before transmitting any data. This may be accomplished using either an explicit approach or an implicit approach.

Using the explicit approach, the transmitter may send a frame (e.g., request) to the receiver. The receiver may determine, based on coding and modulation errors, the amount of interference on the channel. The receiver then sends a feedback frame back to the transmitter that indicates whether the current interference is within the maximum allowed interference.

Using the implicit approach, during a management frame exchange, the receiver (e.g., RX1) knows which transmitter is not within its margin. RX1 may put this information into the management frame and transmit the frame to TX1. Based on this information, TX1 may only transmit if the current energy level is not higher than the energy level of any transmitter that RX1 records during the spatial reuse phase.

As an example of operation, reference is made to FIG. 3. If RX1 knows that TX3 does not fit in the interference margin, it may transmit the management frame to TX1 with the interference margin information. Hence, before TX1 transmits, it may look at its energy level and know if the transmitters that are not within the interference margin may be transmitting. If other transmitters are complying with the interference margin of TX1, then the total interference to RX1 may be controlled.

The interference margin may be set such that the overall channel performance may improve. Referring again to FIG. 3, if transmitter/receiver pair TX1/RX1 301 announces an interference margin of 0, then the other transmitter/receiver pairs (e.g., TX2/RX2 302, TX3/RX3 303) may not transmit after TX1 and any benefits of spatial reuse is lost.

The benefits of using spatial reuse while determining and controlling the interference may be illustrated as follows, with reference to the TX1/RX1 pair of FIG. 3.

Assuming that, without spatial reuse, the signal-to-noise ratio (SNR) is S and for the margin, M, the total interference is $\alpha*M$ (as described previously) and the interference-to-noise ratio (INR) of total interference is I. Then after considering the margin, the signal-to-interference and noise ratio (SINR) is S–I. Assuming that $f$ maps the SINR to the data rate, the data rate without announcing the interference margin is $f(S)$ and the data rate after announcing the margin is $f(S/I)$.

With spatial reuse, the interference margin $\alpha*M$ implies that there are at least $\alpha$ TXs transmitting when TX1 starts the spatial reuse phase. This implies that TX1 may also transmit when these a TXs start the spatial reuse phase. Assuming that the transmission time of each transmitter/receiver pair 301-303 is roughly the same, this implies that the transmission time of TX1 may increase $\alpha$ times after spatial reuse. Hence, the total throughput before and after spatial reuse, when M>0, may have the following relationship to make sure that spatial reuse is beneficial:

$$f(S) < \alpha * f(S/I)$$

wherein $f$ is a function that maps to a signal-to-interference-and-noise ratio of the channel to a data rate, S is the signal-to-noise ratio of the channel, and $I=\alpha*M$ is the potential interference-to-noise ratio of the channel.

The gain G of the spatial reuse phase may be further increased by determining the interference margin M through:

$$G*f(S) < \alpha*f(S-I)$$

It can be seen that if a larger margin M is chosen, f(S−I) would be smaller making it harder to satisfy the equation. If a smaller margin M is chosen, the protected region created by the RX may be relatively larger, and there may not be enough transmitters outside the region for spatial reuse. Thus, one embodiment may choose the largest margin M that satisfies the equation. As a result, each transmitter/receiver pair may have G times improvement and the aggregate throughput may also increase.

Figure 6:
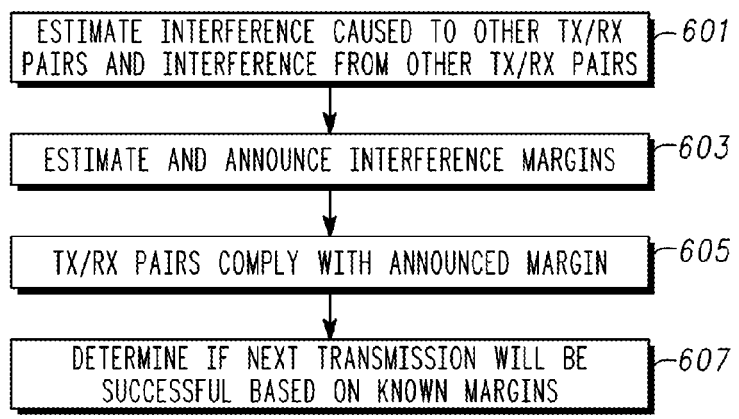
FIG. 6 illustrates a flowchart of an embodiment of a method for channel interference and control during spatial reuse of Wi-Fi channels.

FIG. 6 illustrates a flowchart of an embodiment of a method for channel interference estimation and control during spatial reuse of Wi-Fi channels. Each transmitter/receiver pair may estimate the channel interference it causes to other transmitter/receiver pairs as well as channel the interference caused from other transmitter/receiver pairs 601 during the spatial reuse phase. Once the interference is known, the interference margins for each of the transmitter/receiver pairs may be estimated and announced over the channel 603 in order to control the interference during the spatial reuse phase. The interference margin may be estimated based on the channel interference from other transmitter/receiver pairs and to other transmitter/receiver pairs.

The transmitter/receiver pairs may then comply with the announced margins while communicating over the channel during the spatial reuse phase in order to control the channel interference 605. Each transmitter/receiver pair may estimate if the next transmission will be successful based on the known margins 607. A frame may be transmitted/exchanged when the estimate is greater than a threshold. The embodiment of FIG. 6, as well as other embodiments disclosed herein, may be executed by the AP's and/or the wireless stations.

Figure 7:
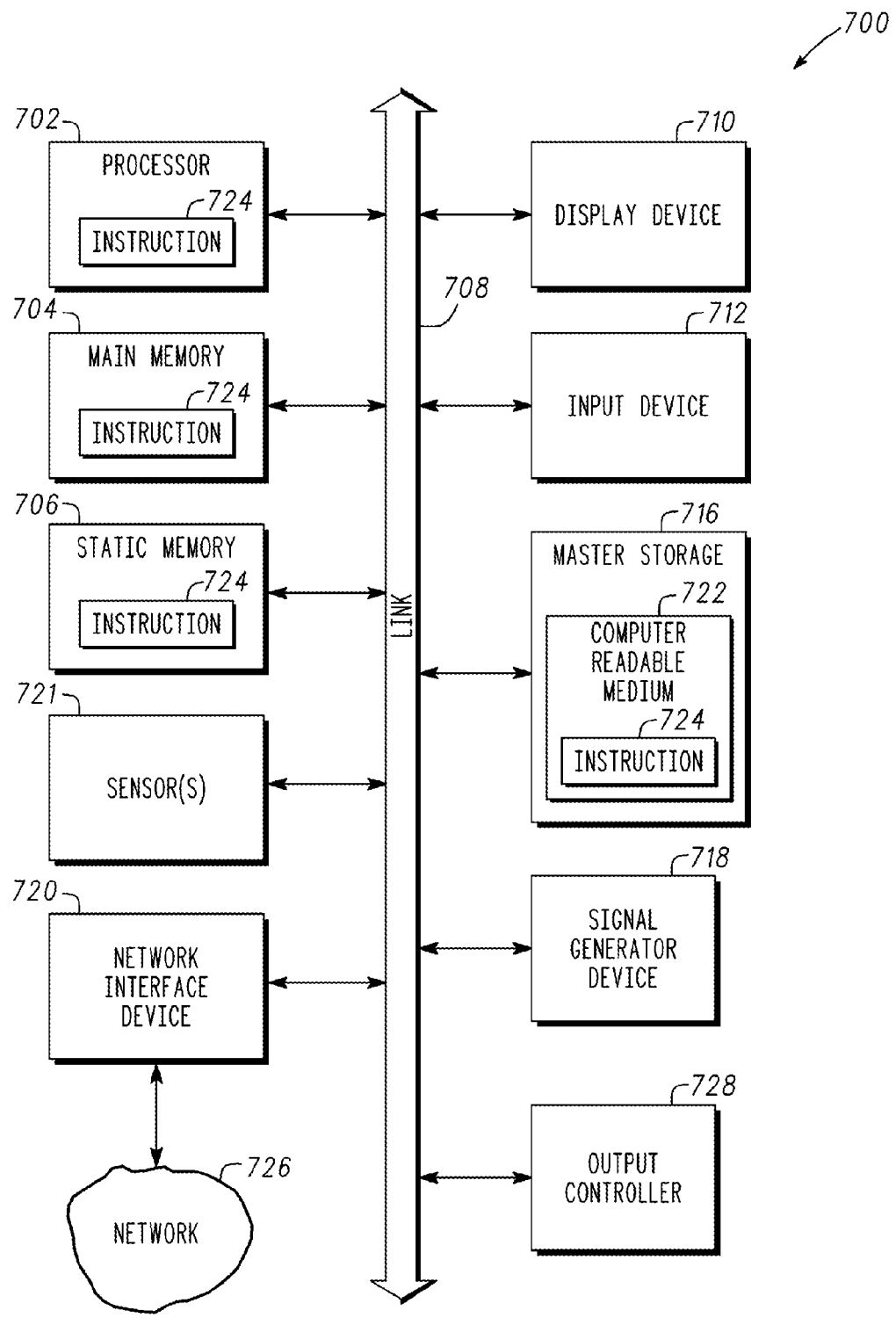
FIG. 7 illustrates a block diagram of a wireless communication device.

FIG. 7 illustrates a block diagram of a wireless communication device 900 (e.g., Wi-Fi device) within which a set or sequence of instructions may be executed to cause the device to perform any one of the methodologies discussed herein. In alternative embodiments, the device operates as a standalone device or may be connected (e.g., networked) to other devices. In a networked deployment, the device may operate in the capacity of either a server or a client device in server-client network environments, or it may act as a peer device in peer-to-peer (or distributed) network environments. The device may be a mobile communication device (e.g., cellular telephone), an AP, a computer, a personal computer (PC), a tablet PC, a hybrid tablet, a personal digital assistant (PDA), or any device capable of executing instructions (sequential or otherwise) that specify actions to be taken by that device. Further, while only a single device is illustrated, the term "device" shall also be taken to include any collection of devices that individually or jointly execute a set (or multiple sets) of instructions to perform any one or more of the methodologies discussed herein. Similarly, the term "processor-based system" shall be taken to include any set of one or more devices that are controlled by or operated by a processor (e.g., a computer) to individually or jointly execute instructions to perform any one or more of the methodologies discussed herein.

Example wireless station 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The wireless station 700 may further include a display unit 710 and an alphanumeric input device 712 (e.g., keyboard, keypad). In one embodiment, the display unit 710 and input device 712 are incorporated into a touch screen display. The wireless station 700 may additionally include a storage device 716 (e.g., a drive unit), a signal generation device 718 (e.g., a speaker), a network interface device 720, and one or more sensors (not shown). Not all of these components are utilized in all devices. For example, an AP may not include a display 710 or an input device 712.

The storage device 716 includes a computer-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the wireless station 700, with the main memory 704, static memory 706, and the processor 702 also constituting computer-readable media. Embodiments may be implemented in one or a combination of hardware, firmware, or software. Embodiments may also be implemented as instructions stored on a computer-readable storage device, which may be read and executed by at least one processor to perform the operations described herein. A computer-readable storage device may include any non-transitory mechanism for storing information in a form readable by a device (e.g., a computer).

While the computer-readable medium 722 is illustrated in an example embodiment to be a single medium, the term "computer-readable medium" may include a single medium or multiple media (e.g., a centralized or distributed database, and/or associated caches and servers) that store the one or more instructions 724. The term "computer-readable medium" shall also be taken to include any tangible medium that is capable of storing, encoding or carrying instructions for execution by the device and that cause the device to perform any one or more of the methodologies of the present disclosure or that is capable of storing, encoding or carrying data structures utilized by or associated with such instructions. The term "computer-readable medium" shall accordingly be taken to include, but not be limited to, solid-state memories, and optical and magnetic media. Specific examples of computer-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), a wireless local area network (WLAN), the Internet, mobile telephone networks, plain old telephone (POTS) networks, and wireless data networks (e.g., WiFi (IEEE 802.11), 3GPP, 4G LTE/LTE-A or WiMAX networks). The term "transmission medium" shall be taken to include any intangible medium that is capable of storing, encoding, or carrying instructions for execution by the device, and includes digital or analog communications signals or other intangible medium to facilitate communication of such software. The network interface device may include one or more antennas for communicating with the wireless network.

Embodiments may be implemented in one or a combination of hardware, firmware, or software. Embodiments may also be implemented as instructions stored on a computer-readable storage device, which may be read and executed by at least one processor to perform the operations described herein. A computer-readable storage device may include any non-transitory mechanism for storing information in a form readable by a device (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

Additional Notes and Examples:

Example 1 is a wireless device including a processor and circuitry to estimate a first channel interference caused, during a spatial reuse phase, by the wireless device to other wireless devices over a channel, to estimate a second channel interference experienced, during the spatial reuse phase, by the wireless device from the other wireless devices over the channel, to estimate an interference margin for the channel based on the first and second channel interferences, to announce the interference margin to the other wireless devices, and to comply with the interference margin while communicating over the channel.

In Example 2, the subject matter of Example 1 can optionally include wherein the wireless device is further configured to estimate if a transmission over the channel will be successful based on the interference margin and to perform a frame exchange with a receiver when the estimate is greater than a threshold.

In Example 3, the subject matter of Examples 1-2 can optionally include wherein the wireless device is a transmitter and further comprising a receiver paired with the transmitter, wherein the transmitter is further configured to exchange frames with the receiver to estimate the first and second channel interferences.

In Example 4, the subject matter of Examples 1-3 can optionally include wherein the transmitter is further configured to estimate the first channel interference in response to $P_{TX}(RX_E/P_{RX})$ where $P_{TX}$ is an indication of a transmit power of the transmitter, $RX_E$ is an indication of energy received by the transmitter from the receiver, and $P_{RX}$ is an indication of a transmit power of the receiver.

In Example 5, the subject matter of Examples 1-4 can optionally include wherein the transmitter is further configured to estimate the second channel interference by the receiver monitoring a received energy resulting from a transmitter transmission.

In Example 6, the subject matter of Examples 1-5 can optionally include wherein the transmitter is configured to estimate the interference margin for the channel in response to Max_M/α where Max_M is an indication of a maximum allowed interference margin for the channel and α is an indication of a maximum quantity of transmissions on the channel.

In Example 7, the subject matter of Examples 1-6 can optionally include wherein the wireless device and a receiver are configured to exchange management frames to estimate the first and second channel interferences.

In Example 8, the subject matter of Examples 1-7 can optionally include wherein the wireless device is further configured to announce the interference margin by transmitting a dedicated frame.

In Example 9, the subject matter of Examples 1-8 can optionally include wherein the wireless device is further configured to announce the interference margin by embedding the interference margin into a frame that has a purpose other than explicitly announcing the interference margin.

In Example 10, the subject matter of Examples 1-9 can optionally include wherein the wireless device is one of an access point (AP) or a wireless station (STA).

Example 11 is a non-transitory computer-readable storage medium that stores instructions for execution by processing circuitry in determining and controlling channel interference during a spatial reuse phase, the operations to perform the channel interference determination and control: estimate a first channel interference caused, during the spatial reuse phase, by a wireless device pair to other wireless device pairs over a channel; estimate a second channel interference experienced, during the spatial reuse phase, by the wireless device pair from the other wireless device pairs over the channel; estimate an interference margin for the channel based on the first and second channel interferences; and announce the interference margin to the other wireless device pairs.

In Example 12, the subject matter of Example 11 can optionally include wherein the operations further transmit the interference margin to the other wireless device pairs in one of a dedicated frame or embedded in a frame.

In Example 13, the subject matter of Examples 11-12 can optionally include wherein the operations further define the interference margin to be represented by M and determined by $f(S)<\alpha*f(S/I)$ where $\alpha$ is an indication of a maximum quantity of transmissions on the channel, $f$ is an indication of the function that maps signal-to-interference and noise ratio of the channel to a data rate, S is an indication of a signal-to-noise ratio of the channel, $I=\alpha*M$ is an indication of a potential interference-to-noise ratio of the channel.

In Example 14, the subject matter of Examples 11-13 can optionally include wherein the operations further increases a gain of the spatial reuse phase by determining interference margin M through $G*f(S)<\alpha*f(S/I)$ where G is an indication of a gain.

Example 15 is a method for channel interference estimation and control during spatial reuse of wireless channels, the method comprising: estimating a first channel interference caused, during the spatial reuse phase, by a wireless device pair to other wireless device pairs over a channel; estimating a second channel interference experienced, during the spatial reuse phase, by the wireless device pair from the other wireless device pairs over the channel; estimating an interference margin for the channel based on the first and second channel interferences; and transmitting the interference margin in a frame to the other wireless device pairs.

In Example 16, the subject matter of Example 15 can optionally include wherein estimating the first channel interference comprises the wireless device pair exchanging management frames.

In Example 17, the subject matter of Examples 15-16 can optionally include wherein estimating the second channel interference comprises the receiver of the wireless device pair monitoring a received energy on the channel resulting from transmissions from the other wireless device pairs.

In Example 18, the subject matter of Examples 15-17 can optionally include wherein estimating the interference margin in response to Max_M/α where Max_M is an indication of a maximum allowed interference margin for the channel and $\alpha$ is a maximum quantity of transmissions on the channel.

In Example 19, the subject matter of Examples 15-18 can optionally include defining the interference margin M by $f(S)<\alpha*f(S/I)$ where $\alpha$ is an indication of a maximum quantity of transmissions on the channel, $f$ is an indication of the function that maps signal-to-interference and noise ratio of the channel to a data rate, S is an indication of a signal-to-noise ratio of the channel, $I=\alpha*M$ is an indication of a potential interference-to-noise ratio of the channel.

In Example 20, the subject matter of Examples 15-19 can optionally include increasing a channel performance of the channel by determining interference margin M through $G*f(S)<\alpha*f(S/I)$ where G is an indication of a gain.

In Example 21, the subject matter of Examples 15-20 can optionally include wherein the wireless device pairs comprise access points/wireless stations, wireless stations/access points, and/or wireless stations/wireless stations.

In Example 22, the subject matter of Examples 15-21 can optionally include wherein the wireless device complies with Institute of Electrical and Electronics Engineers (IEEE) 802.11 ax standard.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless device to perform distributed interference estimation and control in support of spatial reuse of wireless channels, the wireless device comprising:
    memory for storing instructions to be executed by a processor and circuitry;
    the processor and circuitry to estimate a first channel interference caused, during a spatial reuse phase, by the wireless device to other wireless devices over a channel, to estimate a second channel interference experienced, during the spatial reuse phase, by the wireless device from the other wireless devices over the channel, to estimate an interference margin for the channel based on the first and second channel interferences, to announce the interference margin to the other wireless devices, and to comply with the interference margin while communicating over the channel;
    wherein the interference margin for the channel includes an indicator that represents a per-transmission interference limit for transmissions over the channel.

2. The wireless device of claim 1, wherein the wireless device is further configured to estimate if a transmission over the channel will be successful based on the interference margin and to perform a frame exchange with a receiver when the estimate is greater than a threshold.

3. The wireless device of claim 1, wherein the wireless device is a transmitter and further comprising a receiver paired with the transmitter, wherein the transmitter is further configured to exchange frames with the receiver to estimate the first and second channel interferences.

4. The wireless device of claim 3, wherein the transmitter is further configured to estimate the first channel interference in response to $P_{TX}(RX_E/P_{RX})$, where $P_{TX}$ is an indication of a transmit power of the transmitter, $RX_E$ is an indication of energy received by the transmitter from the receiver, and $P_{RX}$ is an indication of a transmit power of the receiver.

5. The wireless device of claim 4, wherein the transmitter is further configured to estimate the second channel interference by the receiver monitoring a received energy resulting from a transmitter transmission.

6. The wireless device of claim 4, wherein the transmitter is configured to estimate the interference margin for the channel in response to Max_M/ $\alpha$ where Max_M is an indication of a maximum allowed interference margin for the channel and $\alpha$ is an indication of a maximum quantity of transmissions on the channel.

7. The wireless device of claim 1, wherein the wireless device and a receiver are configured to exchange management frames to estimate the first and second channel interferences.

8. The wireless device of claim 1, wherein the wireless device is further configured to announce the interference margin by transmitting a dedicated frame.

9. The wireless device of claim 1, wherein the wireless device is further configured to announce the interference margin by embedding the interference margin into a frame that has a purpose other than explicitly announcing the interference margin.

10. The wireless device of claim 1, wherein the wireless device is one of an access point (AP) or a wireless station (STA).

11. The wireless device of claim 1, wherein the wireless device includes at least one radio.

12. The wireless device of claim 11, wherein the wireless device includes one or more antennas.

13. A non-transitory computer-readable storage medium that stores instructions for execution by processing circuitry of a wireless device in determining and controlling channel interference during a spatial reuse phase, the operations to perform distributed channel interference determination and control, comprising:
    estimate a first channel interference caused, during the spatial reuse phase, by a wireless device pair to other wireless device pairs over a channel;
    estimate a second channel interference experienced, during the spatial reuse phase, by the wireless device pair from the other wireless device pairs over the channel;
    estimate an interference margin for the channel based on the first and second channel interferences;
    transmit the interference margin to the other wireless device pairs, wherein the interference margin for the channel includes an indicator that represents a per-transmission interference limit for transmissions over the channel; and
    comply with the interference margin while communicating over the channel.

14. The non-transitory computer-readable storage medium of claim 13, wherein the operations further transmit the interference margin to the other wireless device pairs in one of a dedicated frame or embedded in a frame.

15. The non-transitory computer-readable storage medium of claim 13, wherein the operations further define the interference margin to be represented by M and determined by $f(S) <\alpha *f(S/I)$ where $\alpha$ is an indication of a maximum quantity of transmissions on the channel, $f$ is an indication of the function that maps signal-to-interference and noise ratio of the channel to a data rate, S is an indication of a signal-to-noise ratio of the channel, $I=\alpha*M$ is an indication of a potential interference-to-noise ratio of the channel.

16. The non-transitory computer-readable storage medium of claim 15, wherein the operations further increases a gain of the spatial reuse phase by determining interference margin M through $G*f(S)<\alpha*f(S/I)$ where G is an indication of a gain.

17. A method for distributed channel interference estimation and control during spatial reuse of wireless channels, the method comprising:
- estimating, by a wireless device, a first channel interference caused, during the spatial reuse phase, by a wireless device pair to other wireless device pairs over a channel;
- estimating, by the wireless device, a second channel interference experienced, during the spatial reuse phase, by the wireless device pair from the other wireless device pairs over the channel;
- estimating, by the wireless device, an interference margin for the channel based on the first and second channel interferences, wherein the interference margin includes an indicator that represents a per-transmission interference limit for transmissions over the channel;
- transmitting, by the wireless device, the interference margin in a frame to the other wireless device pairs; and
- complying, by the wireless device, with the interference margin while communicating over the channel.

18. The method of claim 17, wherein estimating the first channel interference comprises the wireless device pair exchanging management frames.

19. The method of claim 17, wherein estimating the second channel interference comprises a receiver of the wireless device pair monitoring a received energy on the channel resulting from transmissions from the other wireless device pairs.

20. The method of claim 17, wherein estimating the interference margin in response to Max_M/ $\alpha$ where Max_M is an indication of a maximum allowed interference margin for the channel and $\alpha$ is an indication of a maximum quantity of transmissions on the channel.

21. The method of claim 17, further comprising defining the interference margin $f(S)<\alpha*f(S/I)$ where $\alpha$ is an indication of a maximum quantity of transmissions on the channel, $f$ is an indication of a function that maps signal-to-interference and noise ratio of the channel to a data rate, S is an indication of a signal-to-noise ratio of the channel, $I=\alpha*M$ is an indication of a potential interference-to-noise ratio of the channel.

22. The method of claim 21, further comprising increasing a channel performance of the channel by determining interference margin M through $G*f(S)<\alpha*f(S/I)$ where G is an indication of a gain of the channel.

23. The method of claim 21, wherein the wireless device pairs comprise access points/wireless stations, wireless stations/access points, and/or wireless stations/wireless stations.

24. The method of claim 17, wherein the wireless device complies with Institute of Electrical and Electronics Engineers (IEEE) 802.11ax standard.

* * * * *